H. A. AIKINS.
RECEIPT SYSTEM.
APPLICATION FILED SEPT. 24, 1906.
994,234.
Patented June 6, 1911.
2 SHEETS—SHEET 1.
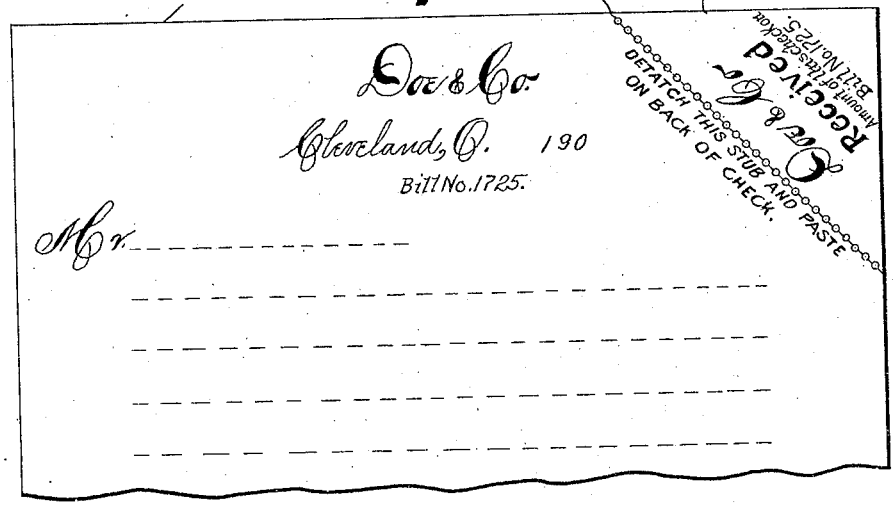
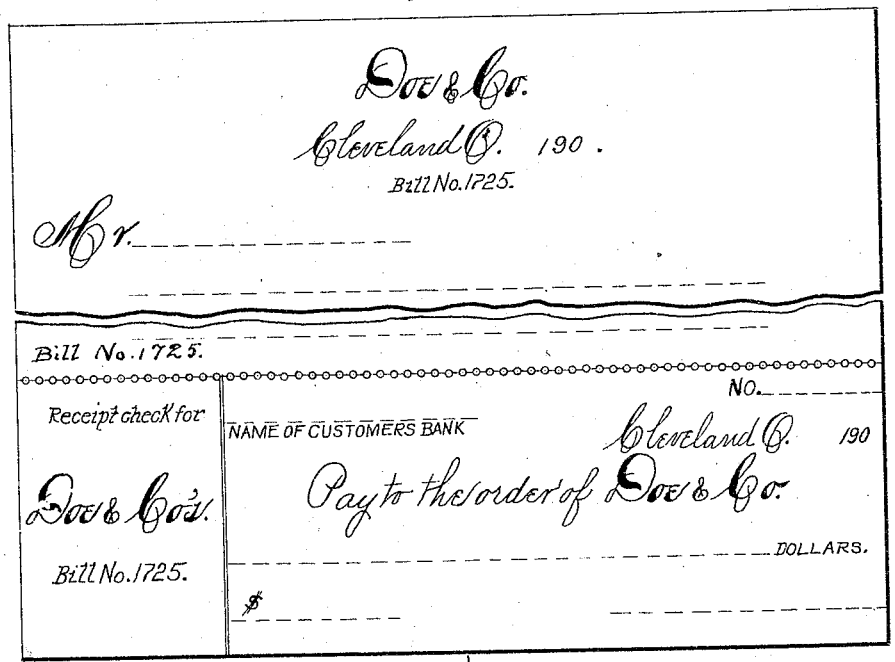
Witnesses:
F. H. Swabb.
Jno. F. Oberlin
Inventor,
Herbert A. Aikins
by his attorney
J. B. Fay H. A. AIKINS.
RECEIPT SYSTEM.
APPLICATION FILED SEPT. 24, 1906.
994,234.
Patented June 6, 1911.
2 SHEETS—SHEET 2.
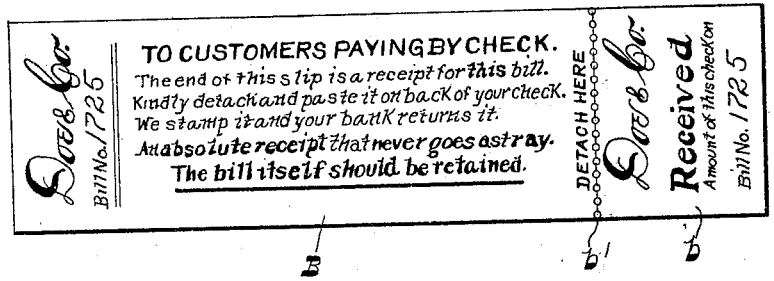
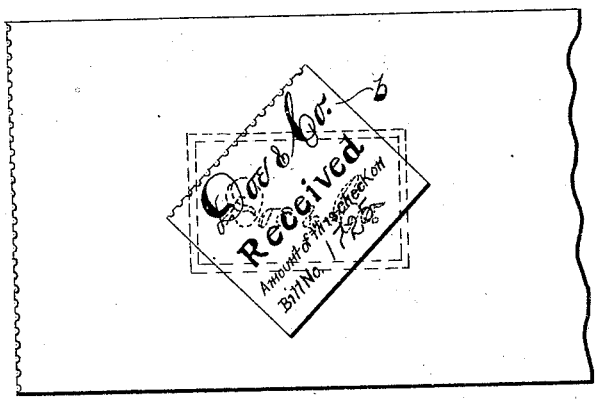
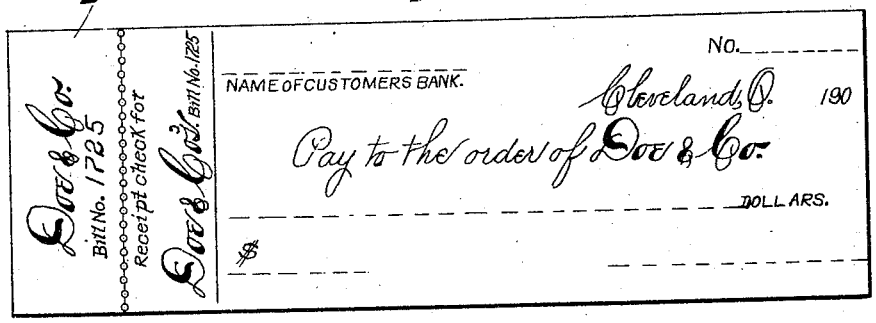
Witnesses:
F. H. Swabb
Jno. F. Oberlin
Inventor,
Herbert A. Aikins
by his attorney
J. B. Fay

UNITED STATES PATENT OFFICE.

HERBERT A. AIKINS, OF CLEVELAND, OHIO.

RECEIPT SYSTEM.

994,234. Specification of Letters Patent. Patented June 6, 1911.

Application filed September 24, 1906. Serial No. 336,042.

*To all whom it may concern:*

Be it known that I, HERBERT A. AIKINS, a citizen of the United States, resident of Cleveland, county of Cuyahoga, and State of Ohio, have invented a new and useful Improvement in Receipt Systems, of which the following is a specification, the principle of the invention being herein explained and the best mode in which I have contemplated applying that principle, so as to distinguish it from other inventions.

My invention relates to the art of accounting and has as its object the provision of means that will do away with the present burdensome and expensive method of receipting bills or statements of account that have been paid by check.

To this end said invention consists of means hereinafter fully described and particularly pointed out in the claims.

The annexed drawings and the following description set forth in detail certain means embodying the invention, such disclosed means constituting but one of various ways in which the principle of the invention may be used.

In said annexed drawings:—Figure 1 represents a blank bill or statement of account embodying one form of my invention; Fig. 2 represents a similar bill or statement with a slightly different form of such invention incorporated therein; Fig. 3 shows a modification of the form represented in Fig. 1 in which the check identification member is in the form of a label; Fig. 4 illustrates, in connection with the particular form of the invention shown in Fig. 3, the manner of using such invention in conjunction with an ordinary check, and Fig. 5 shows a similar modification of the form of the invention represented in Fig. 2.

As is well known by those familiar with business methods, it is the almost universal practice of mercantile firms doing a credit business, of public service corporations and the like where the service is charged up at the end of stated periods, as well as of many other persons and institutions, to render at regular intervals a bill or statement of account.
Such bills or statements, usually, sent out at the first of each month to each patron or customer having a debit balance, are for the most part paid by check. Upon the return of the bill thus accompanied by a check for the proper amount, such bill is duly receipted and sent back to the customer again. In the case of a firm doing a large business, each of these steps involves, in the aggregate, the expenditure of a considerable sum of money for postage if the mails are used, which is usually the most economical method and the one generally employed. Of such expenditure, the greater burden falls upon the firm, since it has to send the bill out twice. Means have hence been long sought to obviate the necessity of returning the receipted bill in order to lower this expense, the necessity of originally rendering the bill being apparently without escape. To this end many business houses do not return the bill at all, the assumption being that the indorsed check, when it finally comes back to the customer, will be sufficient receipt. This method has proven liable to grave abuse, however; for customers not infrequently use checks in cash transactions over the counter, and may even have a check cashed outright as an accommodation. These checks, once they are indorsed, are obviously not susceptible of being distinguished from those drawn in payment, or part payment, of a booked account. A receipt system, hence, to be a successful substitute for the method at present prevailing, must involve in some manner the coöperation of the payer and payee, it must preclude the possibilities of fraud above described, and at the same time it must be inexpensive not merely in the first cost of installation but in the matter of time required to perform it. Otherwise the saving in postage, which it is the purpose of this system to effect, would be inconsequential.

Having thus indicated the requirements of the service which my improved receipt system is designed to perform, I shall now proceed to explain the same. Such system, briefly defined, involves the identification of the check, presented as above described in payment of a bill, as having been actually received on that particular account. Such identification may be accomplished in various ways, but to be effective and satisfactory it must be made or indorsed by the recipient firm.

The simplest form in which I contemplate carrying out my system is shown in Fig. 1, in which A designates the body of a blank bill or statement of account of familiar form. A small portion $a$ of such body is rendered detachable therefrom by the presence of a line of perforations $a'$. The form of such detachable portion, while immaterial, is perhaps most conveniently triangular as shown, and on it and on the body proper of the bill are impressed or written common numbers or other marks of identification. In addition to the mere identification mark on the detachable portion $a$, the latter preferably bears a receipt form such as appears in the figure of reference, e. g. "Doe & Co. received the amount of this check on Bill No. ——" the bill number serving to identify the portion when torn from the bill. On the bill in addition to the usual heading there should appear a legend directing that portion $a$ be detached and pasted upon the back of the check drawn in payment of the bill. To facilitate such attachment to the check the back of the portion may be furthermore suitably gummed. Instead of making the detachable portion $a$ a part of the bill-head, it may be found less expensive to make it a part $b$ of a label or paster B, Fig. 3, entirely separate and apart from such bill-head. In this case both ends of the label are gummed, and the one end, bearing a legend corresponding to that described as appearing on the bill-head A adjacent to portion $a$, is designed to be pasted upon the regular bill or statement form. The label thus becomes, in effect, a part of the bill and to prevent its substitution by another label, a stamp may be impressed partly across its face and partly across the face of the bill. The portion $b$, which bears a receipt form as before, is designed to be detached along perforations $b'$ in exactly the same way and pasted upon the back of the check drawn in payment of the bill. The identification marks in this modified form appear on the two ends of the label B, respectively.

It is of course immaterial whether the receipt form appear on the detachable portion $a$ or $b$, or whether it appear on the bill proper or, what amounts to the same thing, the portion of label B that is pasted thereon. Such receipt form would be simply modified to increase that acknowledgment is made of payment when the detachable portion, bearing nothing but identification number, has been pasted on the back of the check and stamped. A suggested form would be: "The receipt of any payment made by check bearing the numbered slip attached to this bill will be acknowledged by our indorsing such check over such slip."

It will be equally obvious that the common marks employed to identify bill and check need not be wholly arbitrary symbols or numbers but that the receipt tag may bear a date and the customer's name with the statement that the amount of the check to which it is attached is acknowledged as having been paid on service to such date as per bill rendered. The total amount of the service may even be included on such detachable portion if desired thus making the identification still more certain, and leaving the customer free, if he chooses, to tear up the bill.

The appearance of the back of a check with an identifying receipt tag of the form represented in Fig. 3 secured thereon, is shown in Fig. 4. As there appears, the indorsement of the payee is stamped directly over the tag. This is the final step in the carrying out of my system, for there can be no question of the firm's receipt of the check for the specific purpose indicated on the tag when once its acknowledgment has been thus formally made thereto. The indorsement of a check thus tagged in the fashion just described, forms the subject matter of a separate, divisional application, filed April 1, 1911, Serial No. 618,376, in which I have claimed such check, a sheet of paper affixed upon the surface of the same, and bearing a mark identifying it with a particular bill, and the indorsement of the check stamped over such sheet or tag.

The second form of my invention, two modifications of which, corresponding to the two modifications of the first form above described, are shown in Figs. 2 and 5, differs from such first form only in that the detachable portion is enlarged sufficiently to include a check blank. Thus in Fig. 2, the bill-head C is, as before, of any approved design, the only variation being the inclusion of a detachable portion $c$ on which there appears, in addition to the receipt form, a check form to fill out which requires only the insertion of the name of the customer's bank, the amount, and his signature. As in the bill illustrated in Fig. 1, a common identification number is stamped or written on both this detachable portion and the bill proper. Where, instead of printing the detachable portion $c$ on the same sheet as the bill-head, it is considered more desirable, as in the first form, to utilize a label, such label will take as a preferred form that shown in Fig. 5. Here D designates the end that is designed to be pasted on the bill-head, and $d$ the portion made detachable therefrom and bearing the receipt form and check blank.

In the use of the above-described second form of my invention, the indorsement of the check by the payee serves as before as a positive and definite acknowledgment of the receipt of the sum noted in such check for a specific purpose. No possibility for a quibble or misunderstanding is afforded where either form of my system is adopted. The firm is not obliged to indorse the check until it has assured itself as to the correctness of the amounts; and not even in the first form, where the identification tag is pasted on the check instead of being integral with it, is there any possibility of fraud. A new tag cannot be pasted on an old indorsed check for it would then lack the indorsement across its face nor is there any possibility of successfully transferring an old tag to a new check, for the indorsement would only be partial, nor of exchanging one old tag for another, since the indorsement would be almost sure to fail to match, not to speak of the evidences of tampering that would be readily apparent.

As a matter of convenience, the number of the ledger folio on which the customer's account is kept may be used as the identification number on the bill receipt-tag, in which event it does not need to appear on the bill. Or such number may appear on either the tag or bill or on both, in addition to an arbitrary or independent series of identification symbols or numbers. Or the number of the bill may be placed on the ledger folio to facilitate which a second detachable tag bearing the number and nothing else may be provided. Where the ledger folio and the bill are identified in any one of the ways just described, the confusion now frequently resulting from one party paying the bills of another, as in the case of trustees, executors and the like, as also when an amount either greater or less than that called for by the bill is paid, is prevented absolutely. Even where it is the practice of a firm to receipt and return a bill it often happens that a customer not desiring such receipt will simply send in his check without any comment that would serve to indicate its proposed application. The spirit of my invention includes these and such other minor variations of the same order as will be suggested by the slightly different needs of different users.

Having thus described my invention in detail, that which I particularly point out and distinctly claim, is:—

1. A form comprising two sections, one of said sections including a mark identifying it with a particular bill or account, and the other thereof a legend directing customers paying by check to detach such first section and secure it on their checks.

2. A form comprising two sections, one of said sections including a mark identifying it with a particular bill or account and the other thereof a legend directing customers paying by check to detach such first section and secure it on their checks and stating that indorsement over such detached portion is acknowledgment of receipt, substantially as described.

3. A form comprising two sections, one of said sections including a mark identifying it with a particular bill or account, and the other thereof a legend directing customers paying by check to detach such first section and secure it on their checks and stating that the payee's indorsement over such detached portion is acknowledgment of receipt, substantially as described.

4. A receipt system including means for identifying a check as having been paid on a particular bill or statement of account, such means comprising a form including two sections, one of said sections comprising a receipt form, and the other thereof a legend directing customers paying by check to detach such first section and secure it on the back of their checks and stating that the payee's indorsement over such detached portion is acknowledgment of receipt, substantially as described, each of said sections containing a common mark of identification.

Signed by me, this 13" day of September 1906.

HERBERT A. AIKINS.

Attested by—
G. W. SAYWELL,
JNO. F. OBERLIN.